US010367644B2

(12) United States Patent
Warnez et al.

(10) Patent No.: US 10,367,644 B2
(45) Date of Patent: Jul. 30, 2019

(54) METHODS FOR MANAGING CONTENT, COMPUTER PROGRAM PRODUCTS AND SECURE ELEMENT

(71) Applicant: NXP B.V., Eindhoven (NL)

(72) Inventors: Dimitri Warnez, Hamburg (DE); Thierry Gouraud, Leuven (BE)

(73) Assignee: NXP B.V., Eindhoven (NL)

( * ) Notice: Subject to any disclaimer, the term of this patent is extended or adjusted under 35 U.S.C. 154(b) by 137 days.

(21) Appl. No.: 15/001,074

(22) Filed: Jan. 19, 2016

(65) Prior Publication Data

US 2016/0218876 A1 Jul. 28, 2016

(30) Foreign Application Priority Data

Jan. 22, 2015 (EP) .................................... 15152143

(51) Int. Cl.
*H04L 29/06* (2006.01)
*H04L 9/32* (2006.01)
(Continued)

(52) U.S. Cl.
CPC ............ *H04L 9/3234* (2013.01); *G06F 21/77* (2013.01); *G06Q 20/3227* (2013.01); *G06Q 20/3825* (2013.01); *G06Q 20/40* (2013.01); *H04L 9/3263* (2013.01); *H04L 63/123* (2013.01); *H04L 67/34* (2013.01); *H04W 12/10* (2013.01);
(Continued)

(58) Field of Classification Search
None
See application file for complete search history.

(56) References Cited

U.S. PATENT DOCUMENTS 5,856,659 A * 1/1999 Drupsteen ............ G06Q 20/341 235/375
7,021,534 B1 * 4/2006 Kiliccote .............. G06F 21/606 235/380
(Continued)

FOREIGN PATENT DOCUMENTS

CN 1610922 A 4/2005
EP 0 795 844 A1 9/1997
(Continued)

OTHER PUBLICATIONS

Extended European Search Report for Patent Appln. No. 15152143.2 (dated Jul. 2, 2015).

(Continued)

*Primary Examiner* — Maung T Lwin

(57) ABSTRACT

There is disclosed a method for managing content, including generating, by a service provider, an authenticable management script configured to manage content comprised in a secure element; providing, by the service provider, the authenticable management script to the secure element. Furthermore, there is disclosed a method for managing content, comprising: receiving, by a secure element, an authenticable management script for managing content comprised in the secure element; authenticating, by the secure element, the authenticable management script; executing, by the secure element, the management script if the management script is authentic. Furthermore, there are disclosed corresponding computer program products and a corresponding secure element.

10 Claims, 3 Drawing Sheets

300

302 GENERATE AUTHENTICABLE SCRIPT

304 PROVIDE AUTHENTICABLE SCRIPT

(51) Int. Cl.
*H04L 29/08* (2006.01)
*G06F 21/77* (2013.01)
*G06Q 20/32* (2012.01)
*G06Q 20/38* (2012.01)
*G06Q 20/40* (2012.01)
*H04W 12/10* (2009.01)

(52) U.S. Cl.
CPC .. *G06F 2221/2141* (2013.01); *H04L 63/0823* (2013.01); *H04L 63/12* (2013.01)

(56) References Cited

U.S. PATENT DOCUMENTS 7,409,552 B2 * 8/2008 Buttyan ................. G06Q 20/20 713/172
7,472,425 B2 12/2008 Suzuki et al.
7,502,928 B2 * 3/2009 Suzuoki .................. G06F 21/72 711/100
8,429,409 B1 * 4/2013 Wall ...................... H04W 12/04 713/172
8,782,426 B2 * 7/2014 McQuaide, Jr. ....... H04B 1/202 713/186
8,792,637 B2 7/2014 Tang et al.
8,844,026 B2 * 9/2014 Truskovsky ............ G06F 21/44 713/168
2002/0040936 A1 * 4/2002 Wentker .................... G06F 8/60 235/492
2005/0010786 A1 * 1/2005 Michener ................ G06F 21/34 713/185
2005/0138387 A1 * 6/2005 Lam ...................... G06F 21/123 713/185
2005/0195975 A1 * 9/2005 Kawakita .............. H04L 9/0822 380/30
2006/0015748 A1 * 1/2006 Goto ....................... G06F 21/52 713/190
2007/0095927 A1 * 5/2007 Pesonen ............. G06Q 20/3558 235/492
2008/0072048 A1 * 3/2008 Brown .................... G06F 21/34 713/173
2008/0256626 A1 * 10/2008 Masui ....................... H04L 9/32 726/20
2009/0271629 A1 * 10/2009 Michaud ............... H04L 9/3271 713/172
2010/0191972 A1 * 7/2010 Kiliccote .............. G06F 21/606 713/172
2010/0217985 A1 * 8/2010 Fahrny .................... G06F 21/10 713/169
2011/0145586 A1 * 6/2011 Meyn ...................... G06F 21/72 713/176
2011/0307961 A1 * 12/2011 de Perthuis ......... G06F 9/30145 726/26
2012/0079287 A1 * 3/2012 Leclercq ............... G06F 21/575 713/192
2012/0159148 A1 6/2012 Behren et al.
2012/0239567 A1 * 9/2012 Choi ..................... G07F 7/0886 705/41
2013/0122864 A1 5/2013 Haggerty et al.
2013/0145429 A1 * 6/2013 Mendel ................... G06F 21/00 726/4
2013/0266140 A1 * 10/2013 Wall ...................... H04W 12/04 380/255
2013/0290735 A1 * 10/2013 Rombouts ............... G06F 21/33 713/189
2014/0082358 A1 3/2014 Nakhjiri et al.
2015/0026469 A1 * 1/2015 Pizano .................. H04L 9/3231 713/168
2015/0058947 A1 * 2/2015 John ..................... H04W 12/06 726/7
2015/0134958 A1 * 5/2015 Merrien .................. H04W 4/70 713/168
2015/0172255 A1 6/2015 Warnez et al.

FOREIGN PATENT DOCUMENTS

EP 1 365 307 B1 7/2006
EP 1 977 552 B1 8/2012
EP 2 835 995 A1 2/2015
KR 20130026958 A 3/2013
WO 98/43212 A1 10/1998
WO 00/25278 A1 5/2000
WO 2007/132957 A1 11/2007
WO WO 2007132957 A1 * 11/2007 ......... H04L 63/0823
WO 2014/042701 A1 3/2014
WO 2014189749 A1 11/2014

OTHER PUBLICATIONS

Cooper, D. et al. “Internet X.509 Public Key Infrastructure Certificate and Certificate Revocation List (CRL) Profile”, 151 pgs., retrieved from the internet Jun. 24, 2015 at: https://tools.ietf.org/pdf/rfc5280.pdf (May 31, 2008).
Boudriga, N “Smart Card Security: The SIM/uSIM Case”, retrieved from the internet at: http://www.crcnetbase.com/doi/pdf/10.1201/9780849379420.ch4 (Dec. 31, 2010) (abstract only).
Boudriga, N. “Chapter 4—Smart Card Security: The SIM/uSIM Case”, “Security of Mobile Communications”, CRC Press, Taylor & Francis Group, pp. 127-161 (2009).
Boudriga, N. “Security of Mobile Communications”, CRC Press, Taylor & Francis Group, pp. i-xxxiii, pp. 1-44, (includes p. 20, line 9-p. 20, line 14, total 116 pgs.) (2009).

* cited by examiner

300
GENERATE AUTHENTICABLE SCRIPT
302
PROVIDE AUTHENTICABLE SCRIPT
304

400
RECEIVE AUTHENTICABLE SCRIPT
402
AUTHENTICATE AUTHENTICABLE SCRIPT
404
EXECUTE AUTHENTICATED SCRIPT
406

METHODS FOR MANAGING CONTENT, COMPUTER PROGRAM PRODUCTS AND SECURE ELEMENT

CROSS-REFERENCE TO RELATED APPLICATIONS

This application claims the priority under 35 § 119 of European patent application no. 15152143.2, filed on Jan. 22, 2015, the contents of which are incorporated by reference herein.

FIELD

The present disclosure relates to methods for managing content. Furthermore, the present disclosure relates to corresponding computer program products, to a corresponding secure element, and to a corresponding smart card and mobile device.

BACKGROUND

Today, smart cards and mobile devices, such as smart phones, may be used for carrying out many kinds of transactions. For example, smart cards and mobile devices may substitute traditional public transportation tickets or loyalty cards. In order to fulfill these functions, a smart card or mobile device typically contains a so-called secure element. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. The executable applications which are contained in a secure element may need to be changed or updated when the secure element is already in use. These changes and updates should be done in a secure manner. Therefore, there may be a need to securely manage applications on secure elements which are already in use. In broader terms, there may be a need to manage content on secure elements which are already in use.

SUMMARY

There is disclosed a method for managing content, comprising: generating, by a service provider, an authenticable management script configured to manage content comprised in a secure element; providing, by said service provider, the authenticable management script to the secure element.

In illustrative embodiments, said generating comprises signing, by said service provider, the management script using a private key of a public-private key pair.

In further illustrative embodiments, said generating comprises adding, by said service provider, a management certificate provided by a certificate authority to the management script.

In further illustrative embodiments, the management certificate comprises a definition of rights assigned to the service provider, and said definition of rights specifies which management operations may be performed, by the management script, on the content.

Furthermore, there is disclosed a method for managing content, comprising: receiving, by a secure element, an authenticable management script for managing content comprised in said secure element; authenticating, by said secure element, said authenticable management script; executing, by said secure element, the management script if the management script is authentic.

In illustrative embodiments, said receiving comprises receiving the authenticable management script from a service provider.

In further illustrative embodiments, said authenticating comprises verifying a signature of the authenticable management script using a public key of a public-private key pair.

In further illustrative embodiments, the method further comprises receiving from the service provider, by the secure element, a management certificate, wherein said public key is contained in said management certificate.

In further illustrative embodiments, the management certificate comprises a definition of rights assigned to the service provider, and said authenticating further comprises verifying, using said definition of rights, whether the authenticable management script has the right to execute specific management operations.

In further illustrative embodiments, said authenticating further comprises, before verifying the signature of the authenticable management script, verifying a signature of the management certificate using a further public key.

In further illustrative embodiments, the method further comprises recording, by the secure element, a history of management operations performed by the service provider.

Furthermore, there are disclosed computer program products comprising instructions which, when being executed by a processing unit, cause said processing unit to carry out methods of the kind set forth.

Furthermore, there is disclosed a secure element which is arranged to perform a method of the kind set forth.

In illustrative embodiments, a smart card comprises a secure element of the kind set forth.

In further illustrative embodiments, a mobile device comprises a secure element of the kind set forth.

DESCRIPTION OF DRAWINGS

Embodiments will be described in more detail with reference to the appended drawings, in which.

DESCRIPTION OF EMBODIMENTS

Figure 1:
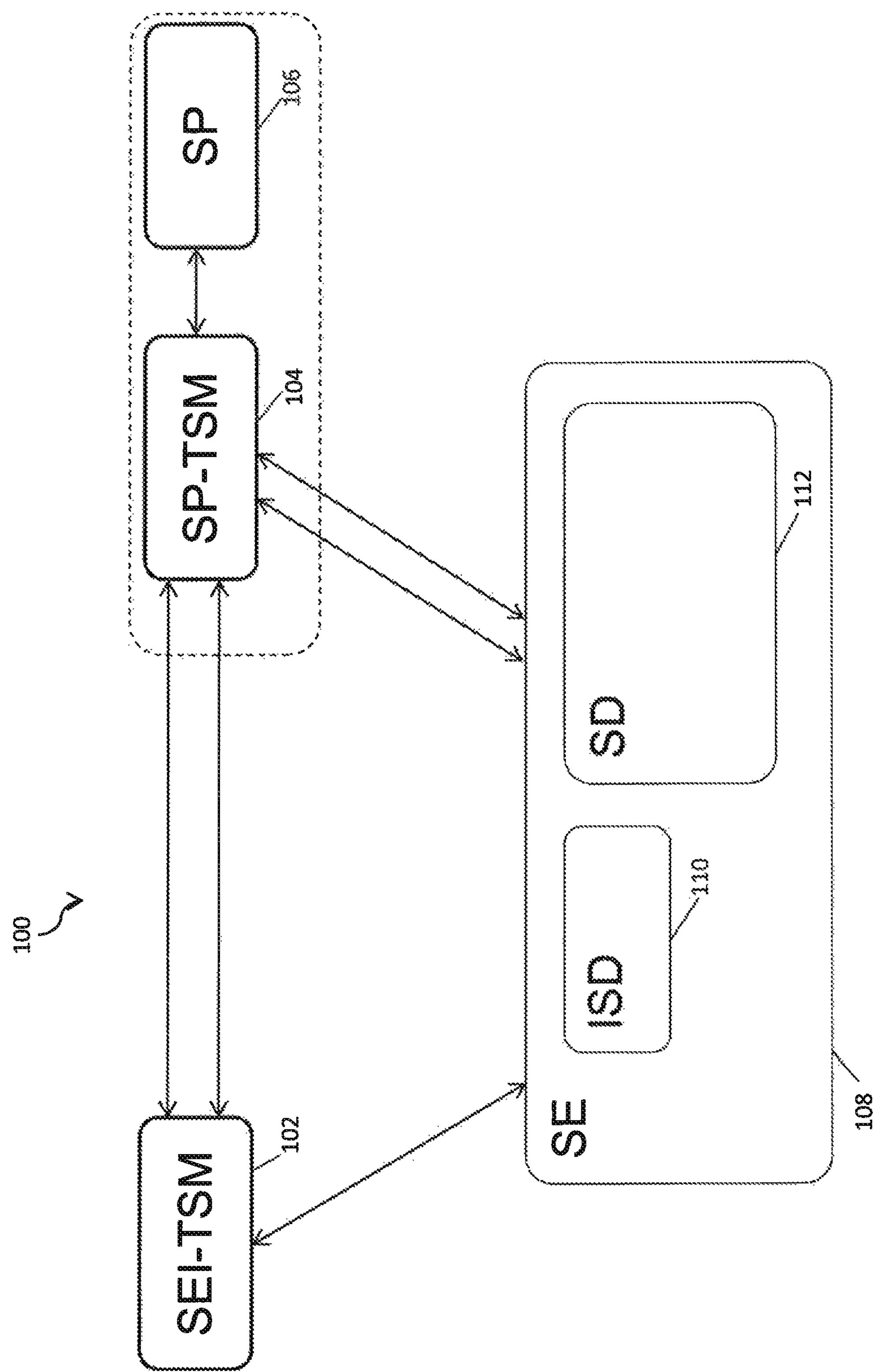
FIG. 1 shows an example of a content management system.

FIG. 1 shows an example of a content management system 100. In most systems, the over-the-air management of secure element content is delegated to a third party which is called a trusted service manager of a secure element issuer 102 (referred to as SEI-TSM), by the owner or producer of the secure element 108. The SEI-TSM 102 manages the content of the secure element 108, for example it may load and install applications on the secure element 108 and it may create one or more security domains 112 with some privileges, which allows other entities, for example a service provider 106, to have access to the installed applications. For the purpose of accessing applications in a security domain 112, the service provider 106 may possess, or at least have access to, cryptographic keys. A further security domain, i.e. an issuer security domain 110, may be reserved for the secure element issuer.

Examples of applications which may be executed on the secure element 108 are smart card applications. Entities such as the service provider 106, which may access applications comprised in the secure element 108, often rely on the knowledge of symmetric secret keys, which may be used to authenticate them to the secure element 108, and which may confer certain application management rights to them. For example, the service provider 106 may have access to a trusted service manager 104 associated with it, and to which it may delegate security-related tasks such as cryptographic operations based on said keys. In order to maintain an adequate level of security, the symmetric secret keys are diversified per secure element.

The following steps may for example be executed in order to install an application in the security domain 112 of the secure element 108. These steps are repeated for each secure element on which said application needs to be installed, because the symmetric secret keys are diversified, i.e. they are different for each secure element. First, the trusted service manager 104 of the service provider 106 (referred to as SP-TSM) may retrieve specific information from the secure element 108, which allows it to contact the correct SEI-TSM 102. The SP-TSM 104 may send a request for installation of an application to the SEI-TSM 102. The SEI-TSM 102 may create the security domain 112 on the secure element 108 and personalize the security domain 112 with cryptographic keys. Before the SEI-TSM 102 installs the application in the security domain 112, it may have to load the application first, for example by retrieving it from the SP-TSM 104. Next, the SEI-TSM 102 installs the application in the security domain 112. Then, the SEI-TSM 102 provides the cryptographic keys of the security domain 112 to the SP-TSM 104. Subsequently, the SP-TSM 104 may use these cryptographic keys to access the application in the security domain 112, and to perform certain application management operations on said application.

This procedure may be relatively complex and expensive, because a real-time key delivery to service providers is required to grant them access to the applications installed by the trusted service manager of the secure element issuer. The trusted service manager of the secure element issuer accounts for a relatively large part of the cost of the application deployment. By means of the presently disclosed system and methods, the procedure may be simplified and the cost of the application deployment may be reduced.

Figure 2:
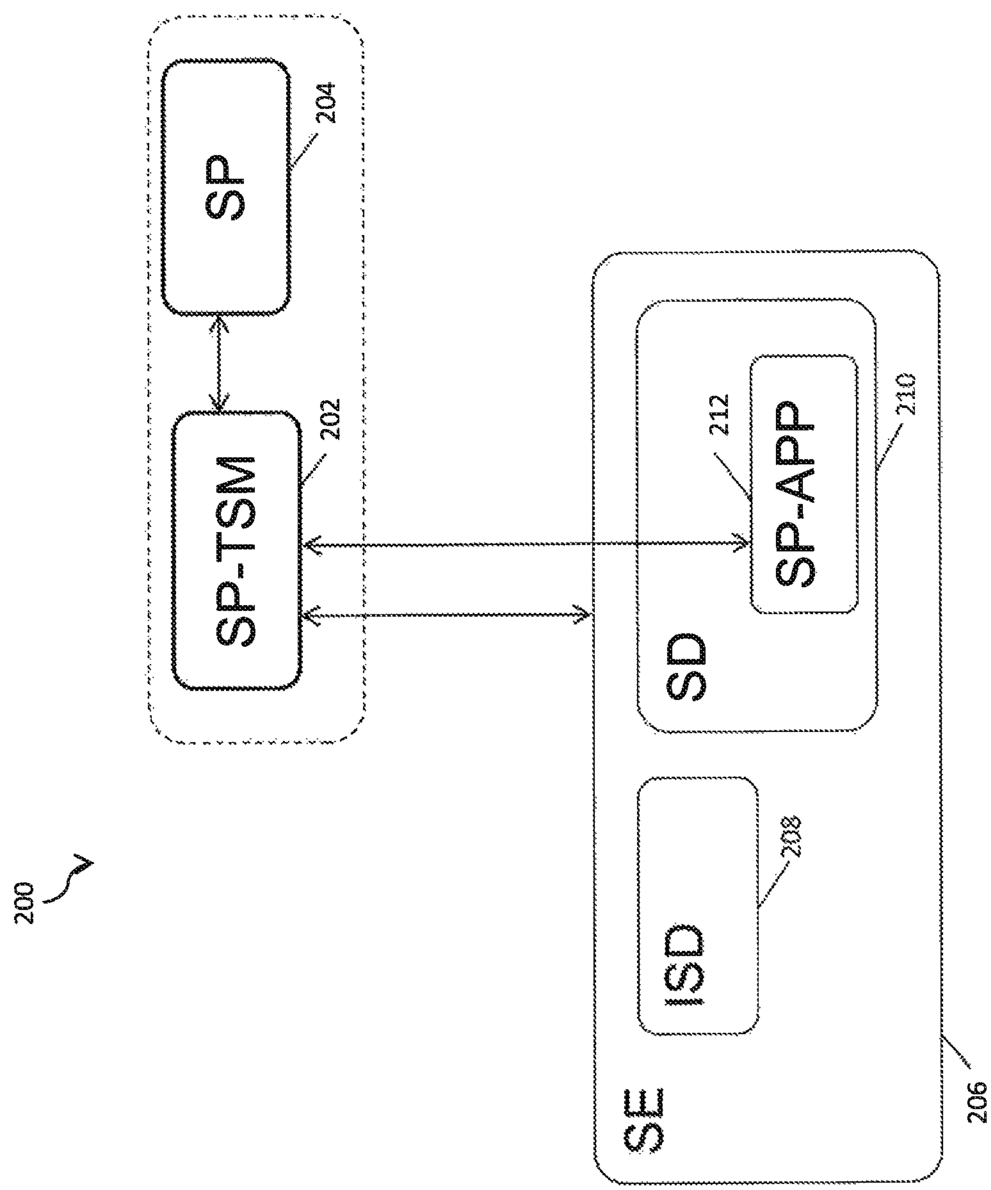
FIG. 2 shows an illustrative embodiment of a content management system.

FIG. 2 shows an illustrative embodiment of a content management system 200. The content management system 200 comprises a service provider 204 and a trusted service manager 202 associated to it, as well as a secure element 206. The secure element comprises a security domain 210 in which applications may be installed, and, optionally, an issuer security domain 208 which is reserved for the secure element issuer. It is noted that, in this system 200, the secure element issuer no longer needs to participate in the procedures for installing, changing and updating applications in the secure element 206. In operation, the trusted service manager 202 of the service provider 204 may install, change or update at least one application 212 in the security domain 210, in accordance with the presently disclosed methods. Furthermore, before installing applications in the secure element 206, the trusted service manager 202 of the service provider 204 may create the security domain 210. That is to say, a management script of the kind set forth may be used to manage not only applications on the secure element, but also security domains, for example.

Figures 3, 4:
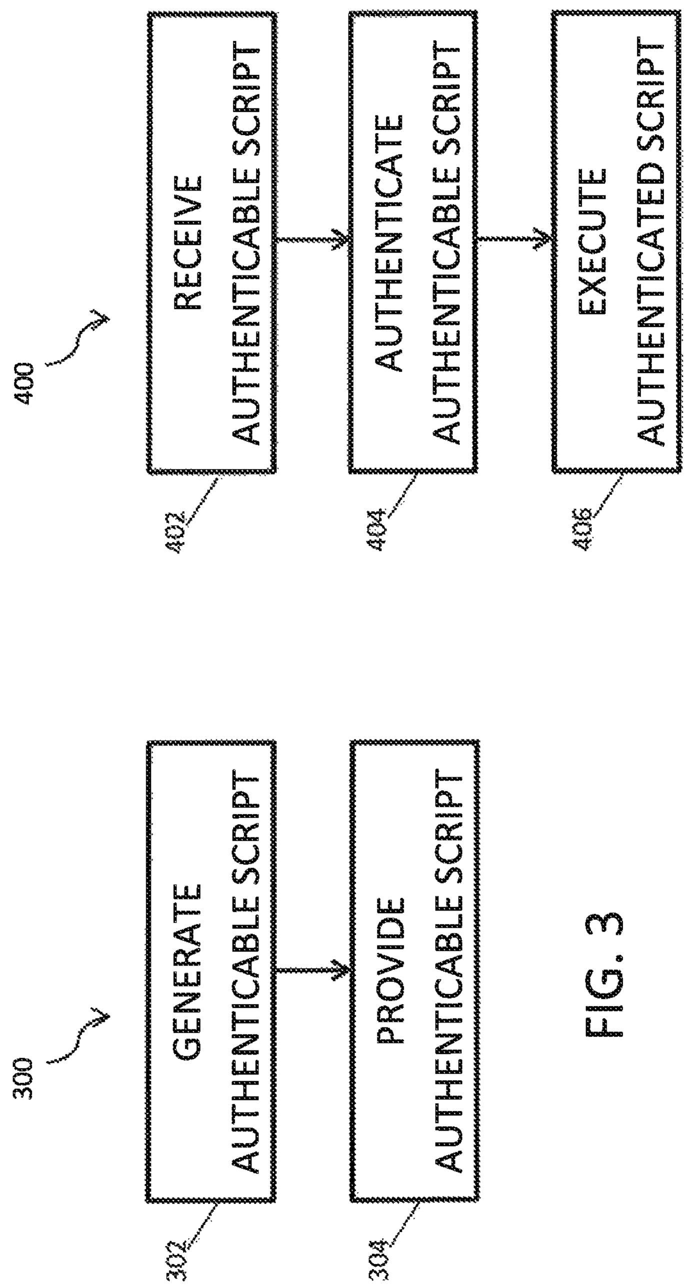
FIG. 3 shows a first illustrative embodiment of a content management method.
FIG. 4 shows a second illustrative embodiment of a content management method.

FIG. 3 shows a first illustrative embodiment of a content management method 300. The method 300 comprises, at 302, generating, by a service provider, an authenticable management script for managing content comprised in a secure element, and, at 204, providing, by said service provider, the authenticable management script to the secure element. These steps may be executed, at least partly, by a computer program. The skilled person will appreciate that the term "service provider" may have a broad meaning, which includes, for example, a trusted service manager associated with said service provider, and to which the service provider has delegated certain tasks. By providing the secure element with a management script that can be authenticated, the secure element may verify whether the management script originates from a trustworthy source. The management script may, for example, comprise instructions which, when being executed, create a security domain in the secure element, or install, change and/or update at least one application comprised in the secure element. The management script may be a generic management script.

In illustrative embodiments, said generating may comprise signing, by said service provider, the management script using a private key of a public-private key pair. In this way, since the corresponding public key may be distributed relatively easily to a plurality of secure elements, the generation of a generic management script may be facilitated. Furthermore, said generating may comprise adding, by said service provider to the management script, a management certificate provided by a certificate authority. In the latter case, it may not be necessary to sign the management script, since because the management certificate already enables the authentication of the management script. Furthermore, the management certificate may carry the public key by means of which the signature of the management script may be verified. In further illustrative embodiments, the management certificate may comprise a definition of rights assigned to the service provider. In that case, said definition of rights specifies which management operations may be performed, by the management script, on the content of the secure element.

FIG. 4 shows a second illustrative embodiment of a content management method 400. It is noted that the content management methods 300 and 400 are interrelated methods. Content management method 400 comprises, at 402, receiving from a service provider, by a secure element, an authenticable management script for managing content comprised in said secure element. Furthermore, the method 400 comprises, at 404, authenticating, by said secure element, said authenticable management script, and, at 406, executing, by said secure element, the management script if the management script is authentic. These steps may be executed, at least partly, by a computer program. By receiving the authenticable management script and authenticating said authenticable management script, the secure element may verify whether the management script originates from a trustworthy source. It is noted that the wording "receiving by a secure element" does not necessarily imply an active operation which would require the secure element to include a receiver that performs an operation of receiving; it might be sufficient if, for example, a receiver is present elsewhere in a smart card or mobile device, which might receive the management script, and then instruct the secure element to store it in a memory unit comprised in said element.

In illustrative embodiments, said authenticating may comprise verifying a signature of the authenticable management script using a public key of a public-private key pair. Furthermore, said public key may be contained in the management certificate. That is to say, the public key which is required to verify the signature of the management script may be carried by a management certificate which has been appended to said script by the service provider. In this case, the service provider does not need to sign the script—hence it does not need to possess the private key—but it may simply pass on the certificate received from the certificate authority by appending it to the script, for example. This may result in a secure and convenient way to manage content in a secure element. Furthermore, the certificate itself may have been signed as well, in particular by the certificate authority. Thus, the secure element may possess a further public key which is used to verify the signature of the certificate. Subsequently, if the signature of the certificate is valid, the secure element may use the public key contained in said certificate to verify the signature of the management script. Then, if the signature of the script is valid as well, the secure element may execute the script. Since the certificate also contains a signature, the level of security may be further increased.

In further illustrative embodiments, the management certificate may comprise a definition of rights assigned to the service provider, and said authenticating may further comprise verifying, using said definition of rights, whether the authenticable management script has the right to execute specific management operations. By defining application management rights in the management certificate, the application management may attain a relatively high granularity.

The presently disclosed methods may at least partly be based on a public key infrastructure (PKI). That is to say, a public-private key pair may be generated. The private key of said pair may be used by a service provider to sign a management script, or by a management certificate authority to generate a management certificate which may be appended to said management script, for example. The corresponding public key of said pair may be provided to secure elements, so that they may verify the management script using said public key. The secure elements may be provided directly with the public key. Alternatively, but without limitation, the secure elements may receive the public key through the management certificate. That is to say, a management certificate appended to a management script may in fact carry the public key which is required to verify the signature of said script. In that case, the secure elements may need a further public key which is to be used to verify a signature of the management certificate.

The presently disclosed methods may employ a PKI-based set-up in the sense that the same public key is provided to a group of secure elements. Sharing the public key across many secure elements is acceptable from a security perspective, while for secret symmetric keys, such sharing may be problematic and risky. The private key may be provided only once to the entity or entities which are entitled to manage the content of the group of secure elements. Because all secure elements in a certain group may contain the same public key, the same management script can be executed across the group of secure elements, in order to perform content management operations. In other words, the management script may be a generic management script. Thus, the presently disclosed methods facilitate the broadcasting of management scripts to a plurality of secure elements.

A certain degree of granularity may be achieved by means of a PKI-chaining set-up wherein content management rights may be delegated. The delegation of content management tasks to the service provider may be based on management certificates. That is to say, the entity that possesses, or has access to, the private key corresponding to the public key set in the secure elements, may delegate the content management to third parties using said management certificates. Such an entity may for example be a management certificate authority. In this case, the service provider does not need to possess, or have access to, the private key corresponding to the public key in the secure element. That is to say, the service provider may simply pass on a management certificate to the secure element by adding it, when it has received it from said authority, to the management script. In that case, a further public key in the secure element may be used to verify the signature of the management certificate which has been passed on by the service provider. If the signature of the management certificate is valid, the secure element may extract a public key from said certificate and use the extracted public key for verifying the signature of the management script. The management certificate may have been obtained only once and may contain a definition of content management rights assigned to the service provider. The management certificate may be added to, and thus form part of, the management script. Thus, the content management delegation does not require an interaction with the secure element, as would be required for a set-up based on symmetric secret keys.

A management certificate may contain a relatively detailed definition or description of the rights that a service provider has for the management of secure element content. These rights may be verified by the secure element as part of the verification of the management certificate. That is to say, content management operations embedded in a management script that are allowed by the certificate may be executed, and content management operations that are not allowed may be denied. The content management rights included in a management certificate may for instance define the number of security domains with or without authorized management and the number of applications or application instances that may be created. Thus, different SP-TSMs may receive different content management rights. The history of the content management operations performed by a certificate owner, i.e. a service provider, may be recorded. Then, for example, a content management operation contained in a management script may be executed if the assigned rights are not consumed or exhausted. Whether the assigned rights have been consumed or exhausted may be determined by comparing the history and the rights defined in the management certificate contained in the management script being processed.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 content management system
102 trusted service manager of secure element issuer
104 trusted service manager of service provider
106 service provider
108 secure element
110 issuer security domain
112 security domain
200 content management system
202 trusted service manager of service provider
204 service provider
206 secure element
208 issuer security domain
210 security domain
212 application provided by service provider
300 content management method
302 generate authenticable management script
304 provide authenticable management script to secure element
400 content management method
402 receive authenticable management script
404 authenticate authenticable management script
406 execute authenticable management script

The invention claimed is:

1. A method for managing content, comprising:

generating, by a service provider, an authenticable management script configured to manage content comprised in a secure element;

adding, by the service provider, a management certificate provided by a certificate authority to the authenticable management script, wherein the management certificate comprises a definition of rights of specific management operations permitted to be performed by the service provider using an authenticated management script on content of the secure element; and providing, by said service provider, the authenticable management script to the secure element, wherein the authenticable management script is authenticated by the secure element, the authenticated management script is verified to have a right to execute specific management operations by the definition of rights on the content of the secure element, and the specific management operations are executed with the authenticated management script by the secure element.

2. The method as claimed in claim 1, wherein said generating further comprises:

signing, by said service provider, the authenticable management script using a private key of a public-private key pair.

3. A method for managing content, comprising:

receiving, by a secure element, from a service provider, an authenticable management script for managing content comprised in said secure element;

receiving, by the secure element, from the service provider, a management certificate provided by a certificate authority, wherein the management certificate comprises a definition of rights of specific management operations permitted to be performed by the service provider using an authenticated management script on content of the secure element;

authenticating, by said secure element, said authenticable management script;

verifying, using the definition of rights, that the authenticated management script has a right to execute specific management operations on the content of the secure element; and executing, by said secure element, the specific management operations with the authenticated management script.

4. The method as claimed in claim 3, wherein said authenticating further comprises:

verifying a signature of the authenticable management script using a first public key of a public-private key pair.

5. The method as claimed in claim 4, further comprising:

wherein said first public key is contained in said management certificate.

6. The method as claimed in claim 5, further comprising:

verifying a signature of the management certificate using a second public key.

7. The method as claimed in claim 3, further comprising:

recording, by the secure element, a history of management operations performed by the service provider.

8. The method of claim 3, wherein the secure element is coupled to a receiver in a smart card.

9. The method of claim 3, wherein the secure element is coupled to a receiver in a mobile device.

10. A non-transitory computer-readable medium comprising instructions which, when being executed by a processing unit, cause said processing unit to carry out a method for managing content, the non-transitory computer-readable medium comprising:

instructions for receiving, by a secure element, from a service provider, an authenticable management script for managing content comprised in said secure element;

instructions for receiving, by the secure element, from the service provider, a management certificate provided by a certificate authority, wherein the management certificate comprises a definition of rights of specific management operations permitted to be performed by the service provider using an authenticated management script on content of the secure element;

instructions for authenticating, by said secure element, said authenticable management script;

instructions for verifying, using the definition of rights, that the authenticated management script has a right to execute specific management operations on the content of the secure element; and instructions for executing, by said secure element, the specific management operations with the authenticated management script.

* * * * *